Dec. 1, 1925.
I. S. HIRSCH
FLUOROSCOPIC SCREEN
Filed Oct. 14, 1922
1,563,856
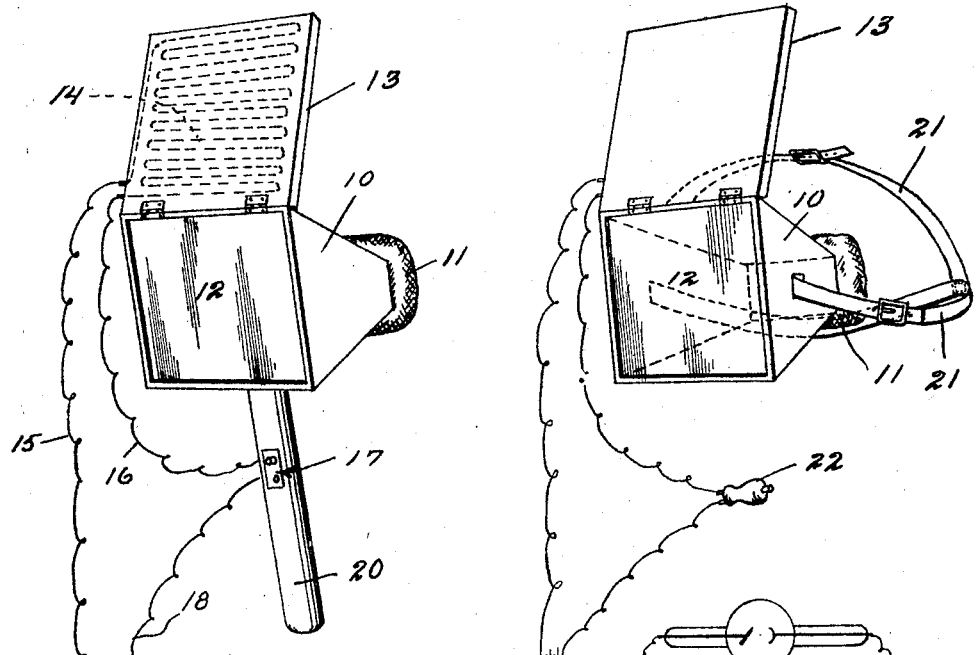
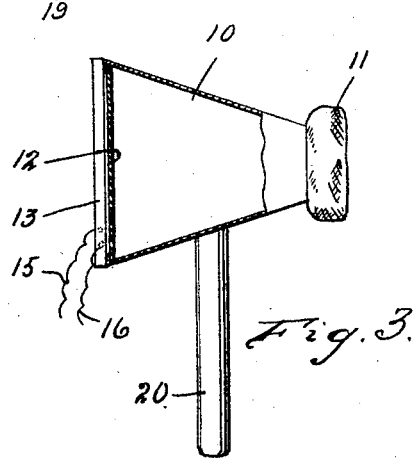
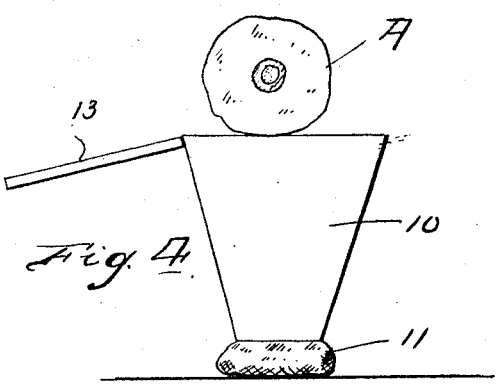
Inventor
I. S. Hirsch
By Patented Dec. 1, 1925.

1,563,856

UNITED STATES PATENT OFFICE.

ISAAC SETH HIRSCH, OF NEW YORK, N. Y.

FLUOROSCOPIC SCREEN.

Application filed October 14, 1922. Serial No. 594,549.

*To all whom it may concern:*

Be it known that I, ISAAC SETH HIRSCH, a citizen of the United States, residing at New York, in the county of New York and State of New York, have invented certain new and useful Improvements in Fluoroscopic Screens, of which the following is a specification.

This invention relates to X-ray apparatus, particularly to fluorescent screens, and has for its object the provision of a screen of this character which has persistence of fluorescence and consequently the retention of the image for a long period of time after the tube has ceased to have its energizing action.

The property of the X-ray to cause fluorescence of certain chemical compounds is well known and this property is utilized in the production of the screen used in fluoroscopic examinations. Heretofore the screen used for this purpose has been such as to give fluorescence which, however, disappears immediately after the cessation of the energization of the X-ray tube.

With these facts in view, I have designed the present device, which includes a fluoroscopic screen in which there is not only fluorescence at the time of energization of the tube, but which also possesses the property of persistence of fluorescence after the tube has ceased to be energized, the screen of my device being prepared with a special compound which will retain the image with such persistence that the operator may be enabled to re-examine the image at any desired time, even many hours after the screen has been originally illuminated, thus permitting reference to an image previously obtained and transference of this image away from the X-ray room, something heretofore impossible in fluoroscopy, it being, moreover, possible to provide suitable means for making exposures on the different parts of the screen so that different views may be subsequently studied simultaneously, a further possibility being the making of stereoscopic images which may be viewed by proper means.

The compound used in the making of my screen is made by precipitating pure zinc sulphide containing a trace of copper and then firing or heating the precipitate to cause it to crystallize and develop fluorescence and phosphorescence. This material is incorporated in any suitable medium such as gelatin or cellulose acetate or nitrate dissolved in any suitable solvent and the whole mixture forms an emulsion. This sensitive fluorescent emulsion may be spread as usual, either on paper or compoboard or on any other surface permeable to the radiation, such as aluminum, silver, etc. The screen may then be inserted into such a box as is commonly used, as a so-called "hand fluoroscope" or in a frame in any other way as used in practical radiographic work. After the screen has been illuminated and when, after a period as judged by the eye in the dark, the image has faded from view, or at any time after its primary illumination, the image may by suitable means, which include the application of heat by any method, be revived and thus utilized as has been stated above. Such a method of intensifying or reviving the image is absolutely new in the art. The methods of making an exposure of the screen are as follows:

The screen may be inserted within the usual paper carriers used for holding films or negatives. After exposure it may be viewed in the dark room by removing it from the carrier or it may be inserted in a box of the usual variety, the details of the construction and arrangement of parts of which are illustrated in the drawings in which Figure 1 is a perspective view of one form of screen holding device.

Figure 2 is a similar view of a modified form.

Figure 3 is a side elevation with parts broken away and in section.

Figure 4 is a view of the device showing it used for making an image from an object disposed upon it.

Referring more particularly to the drawings, I have shown the screen holder as consisting of the usual frusto-pyramidal box or casing 10 having its smaller end provided with the conventional eye piece 11 and having its larger end provided with any preferred means for holding in position the screen 12 which has been prepared as above described.

Attached to this box is an electric heater which may be hinged on one edge of the larger end, as shown in the drawings, or which might be otherwise movably mounted. This heater may be of any preferred construction and the details thereof are not important. The particular means for energizing the electric heater is of no consequence though in the drawings I have shown the resistance coil 14 thereof as having its terminals connected with wires 15 and 16, the latter of which leads to a control switch 17 from which leads a wire 18 which, together with the wire 15, is connected with the opposite terminals of any source of current 19. In Figure 1, I have shown the device as mounted upon a handle 20 which also carries the switch though the handle may be replaced by head straps 21 by means of which the device may be secured upon the head of the operator instead of being held in the hand. In this second form the switch 17 is replaced by a suitable push button switch 22 of any ordinary or preferred type.

In the use of the device the X-ray tube is energized, the heater 13 is swung away from the screen 12, as shown in Figures 1 and 2, the device is placed with its large end against the object to be examined and the small end or eye piece 11 is engaged about the observer's eyes. When the tube is energized the observer sees a brilliant Röntgen image upon the screen. The tube may be energized for only a few moments and the energization then stopped. The image on the screen may then be viewed independently of the illumination of the tube. By swinging the heater 13 down against the screen and operating the switch 17 or 22 to close the circuit through the heating coil 14, the screen will be heated and this will revive or intensify the image so as to make the minutest details visible many hours after the time the examination was made, and at any distance from the examination room. The advantages of such a method of temporarily recording are too obvious to need enumeration. For instance, if at any time within several hours, it is desired to make a permanent record of the image, the illuminated screen or surface may, in the photographic dark room, be brought into contact with a sensitized plate for a short period, the plate being subsequently developed in the regular way so that a typical X-ray photograph will be produced. The image on the screen may be instantaneously removed at any time by exposure of the screen to light or again to the X-ray with or without another object interposed.

In Figure 4, I have illustrated the use of the device in making an image of an object A laid upon the screen in position to be affected by rays from the tube B. Figure 3 shows the electric heating device as swung into engagement with the screen so as to effectually heat the same when reviving of the image is desired. Of course the heating device need not be attached to the screen holder but may be a separate and isolated part.

From the foregoing description and a study of the drawings, it will be seen that I have provided a novel X-ray device which will be of manifest advantage in a wide variety of ways and which will greatly facilitate the making of fluoroscopic images which may be retained for a long time and subsequently revived for a still greater length of time so that the maximum benefit to be derived from examinations may be had.

While I have shown and described the preferred embodiment of my invention, it is of course to be understood that I reserve the right to make such changes in the form, construction and arrangement of parts as will not depart from the spirit of the invention or the scope of the subjoined claims.

I claim:

1. In an X-ray apparatus, a casing having an eye piece, a fluoroscopic screen within the casing, and means for applying heat to said screen subsequent to the exposure thereof to X-rays.

2. In an X-ray apparatus, a casing having an eye piece, a fluoroscopic screen within the casing and means for applying heat to said screen subsequent to the exposure thereof to X-rays, said screen being coated with fluorescent material having the property of retention of image.

3. A fluoroscopic screen device comprising a casing having an eye piece and containing a fluorescent screen, and a heater carried by the casing and disposable against the screen whereby to effect heating thereof to revive a Röntgen image thereon.

4. A fluoroscopic screen having a sensitized surface capable of receiving and retaining a Röntgen image, the fluorescence of the surface being responsive to temperature changes.

5. In a device of the character described, a carrier having a viewing orifice, a fluorescent screen within the carrier, and an electric heater movably mounted upon the carrier and disposable over the screen whereby to effect heating thereof.

6. In a fluoroscopic examination device, a carrier formed as a casing having a viewing orifice at one end and provided at its other end with a fluorescent screen, and an electric heater hinged upon the second mentioned end of the casing, the heater operating to heat the screen for reviving a Röntgen image thereon.

7. The process of reviving a Röntgen image on a fluorescent screen consisting in applying heat thereto.

8. A fluoroscopic screen having a sensitive surface capable of receiving and retaining a Röntgen image, the activity of said surface being variable in response to temperature variations.

9. The herein described method of making and reviving a Röntgen image upon a fluorescent screen consisting in exposing the screen to the rays from an X-ray tube with the object of examination interposed, and subsequently excluding extraneous light from the screen to retain the image, and at a comparatively remote subsequent time applying heat to the screen for reviving the image.

10. The method of controlling the intensity of a Röntgen image on a fluoroscopic screen, consisting in subjecting the screen to temperature variations.

11. The process of obtaining persistence of an image on a fluorescent screen consisting in applying heat to the surface of the screen.

12. A fluoroscopic screen having a sensitive surface formed as a coating of emulsion consisting of a fluent vehicle and precipitated zinc sulphide containing a trace of copper, the precipitate being heated to effect crystallization and to develop fluorescence and phosphorescence.

13. The process of intensifying an image on a fluorescent screen consisting in applying heat to the screen.

14. A fluorescent screen consisting of a base of material pervious to the X-rays and coated with a sensitive emulsion consisting of precipitated pure zinc sulphide containing a trace of copper, the precipitate being heated.

15. A fluorescent screen consisting of a base of material pervious to X-rays coated with a sensitive emulsion consisting of precipitated pure zinc sulphide containing a trace of copper, the precipitate being heated, the said screen having the property of persistence of image and said emulsion being sensitive to the action of heat whereby to intensify the image or to revive a fading image.

In testimony whereof I hereto affix my signature.

I. SETH HIRSCH.